United States Patent [19]
Grover et al.

[11] Patent Number: 5,497,404
[45] Date of Patent: Mar. 5, 1996

[54] TRANSMISSION ERROR RECOVERY FOR DIGITAL COMMUNICATION SYSTEMS USING VARIABLE LENGTH DATA PACKETS WHERE DATA IS STORED IN HEADER LOCATIONS OF MEMORY

[75] Inventors: Glen A. Grover, San Diego; Paul Moroney, Olivenhain, both of Calif.

[73] Assignee: General Instrument Corporation, Hatboro, Pa.

[21] Appl. No.: 910,192

[22] Filed: Jul. 14, 1992

[51] Int. Cl.$^6$ ............................... H04J 3/06; H04L 7/00; H04L 25/38

[52] U.S. Cl. ............................... 375/357; 375/366; 375/369; 370/110.1; 370/106; 370/105.1; 371/30

[58] Field of Search ........................ 375/357, 363, 375/365, 368, 354, 364, 366, 369; 370/105.1, 110.1, 111, 106, 105.4, 105.5; 371/30

[56] References Cited

U.S. PATENT DOCUMENTS

| | | | |
|---|---|---|---|
| 4,807,248 | 2/1989 | Pyatt et al. | 375/365 |
| 4,930,125 | 5/1990 | Bains | 370/105.1 |
| 5,289,276 | 2/1994 | Siracusa et al. | 348/467 |

FOREIGN PATENT DOCUMENTS

WO92/08289  5/1992  WIPO.

OTHER PUBLICATIONS

W. Paik, "DigiCipher—All Digital, Channel Compatible, HDTV Broadcast System," IEEE Transactions on Broadcasting, vol. 36, No. 4, Dec. 1990.

M. Yoneda, et al., "An Experimental Digital VCR with New DCT-Based Bit-Rate Reduction System," *IEEE Transactions on Consumer Electronics*, vol. 37, No. 3, Aug., 1991, New York, U.S.A., pp. 275–282.

K. Tzou, "An Intrafield DCT-Based HDTV Coding for ATM Networks," *IEEE Transactions on Circuits and Systems for Video Technology*, vol. 1, No. 2, Jun., 1991, New York, U.S.A., pp. 184–196.

*Patent Abstracts of Japan*, vol. 15, No. 148, Apr. 15, 1991, JP-A-03 024 887, Feb. 1, 1991.

Excerpt from internal, unpublished, restricted distribution Document No. HDVT-090-008, "DigiCipher NTSC Prototype (Preliminary)," General Instrument Corporation, Jun. 11, 1990.

*Primary Examiner*—Young T. Tse
*Assistant Examiner*—William Luther
*Attorney, Agent, or Firm*—Barry R. Lipsitz

[57] ABSTRACT

A succession of variable length data packets containing a header portion and data portion are received. Selected data from the data packet headers is stored in designated locations of a header memory. A data packet start address is provided with each stored header portion to designate a location in a data memory for commencing the storage of data contained in a corresponding data packet. The data from the received data packets is stored commencing in the data memory locations designated by the corresponding data packet start addresses. In an illustrated embodiment, the data packets are macroblocks from digitized television frames. A plurality of next data packet position indicators are provided in the data, for use in periodically verifying macroblock boundaries during the receipt of the television data and to provide a rapid recovery from a transmission error affecting the actual or identified length of a macroblock.

16 Claims, 4 Drawing Sheets

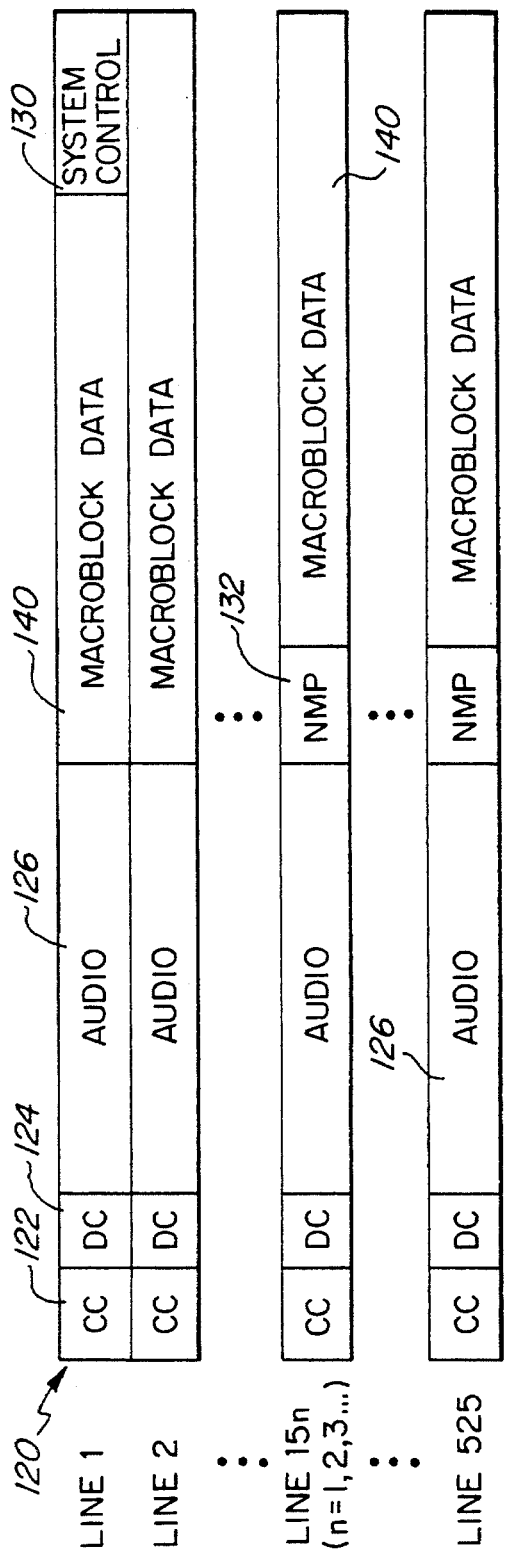
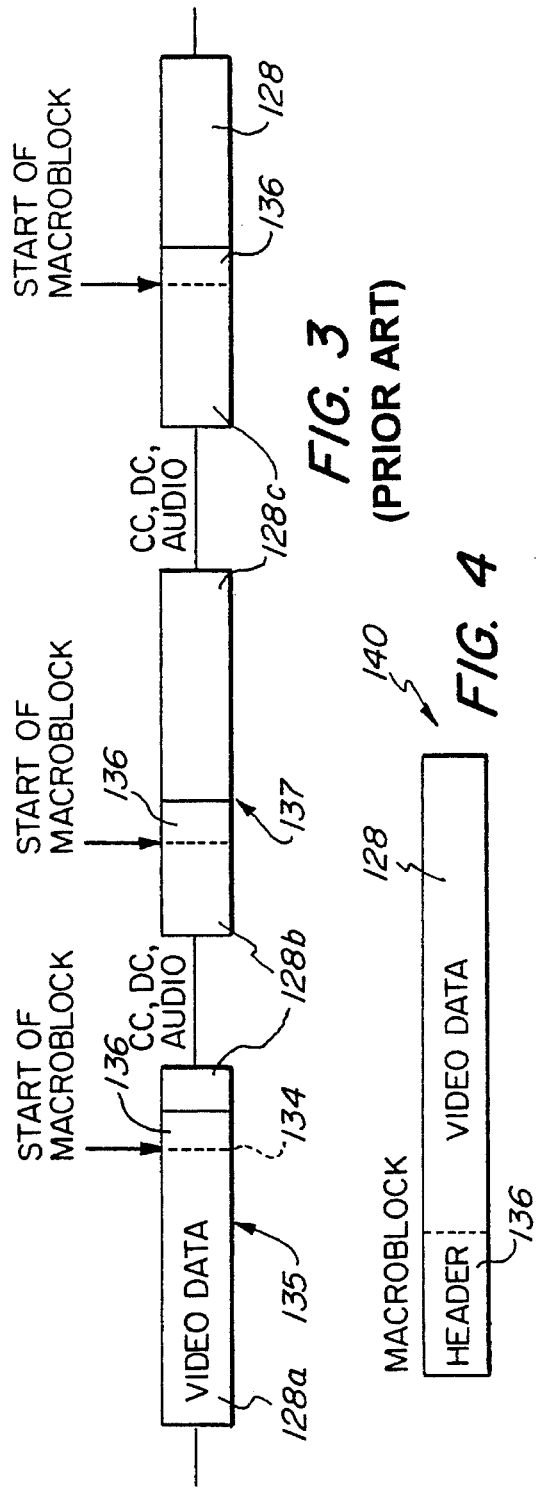

TRANSMISSION ERROR RECOVERY FOR DIGITAL COMMUNICATION SYSTEMS USING VARIABLE LENGTH DATA PACKETS WHERE DATA IS STORED IN HEADER LOCATIONS OF MEMORY

BACKGROUND OF THE INVENTION

The present invention relates to the communication of digital data, and more particularly to a method and apparatus for facilitating the recovery from transmission errors in received data, such as compressed video data.

Television signals are conventionally transmitted in analog form according to various standards adopted by particular countries. For example, the United States has adopted the standards of the National Television System Committee (NTSC). Most European countries have adopted either PAL (Phase Alternating Line) or SECAM (Sequential Color and Memory) standards.

Digital transmission of television signals can deliver video and audio services of much higher quality than analog techniques. Digital transmission schemes are particularly advantageous for signals that are broadcast by satellite to cable television affiliates and/or directly to home satellite television receivers. It is expected that digital television transmitter and receiver systems will replace existing analog systems just as digital compact discs have largely replaced analog phonograph records in the audio industry.

A substantial amount of digital data must be transmitted in any digital television system. In a digital television system, a subscriber receives the digital data stream via a receiver/descrambler that provides video, audio and data to the subscriber. In order to most efficiently use the available radio frequency spectrum, it is advantageous to compress the digital television signals to minimize the amount of data that must be transmitted.

The video portion of a television signal comprises a sequence of video "frames" that together provide a moving picture. In an interlaced transmission scheme, each frame is transmitted as two separate "fields," an even field and an odd field, which are interlaced to provide a full video frame. Such interlacing avoids the perception of flicker in the received video image. In the NTSC system, each displayed frame consists of 525 horizontally swept lines. Roughly thirty frames, corresponding to sixty fields, are displayed each second.

In digital television, each line of a video frame is defined by a sequence of digital data referred to as "pixels." A large amount of data is required to define each video frame of a television signal. For example, 5.9 megabits of data is required to provide one video frame at NTSC resolution. This assumes a 512 pixel by 480 line display that is used with eight bits of intensity value for each of the primary colors red, green and blue. High definition television (HDTV) requires even more data to provide each video frame. In order to manage this amount of data, particularly for HDTV applications, the data must be compressed.

Video compression techniques enable the efficient transmission of digital video signals over conventional communication channels. Such techniques use compression algorithms that take advantage of the correlation among adjacent pixels in order to derive a more efficient representation of the important information in a video signal. The most powerful compression systems not only take advantage of spatial correlation, but can also utilize similarities among adjacent frames to further compact the data. In such systems, differential encoding (DPCM) is used to transmit only the difference between an actual frame and a prediction of the actual frame. The prediction is based on information derived from a previous frame of the same video sequence. Examples of such systems can be found in U.S. Pat. Nos. 5,068,724 entitled "Adaptive Motion Compensation for Digital Television" and 5,057,916 entitled "Method and Apparatus for Refreshing Motion Compensated Sequential Video Images." A description of an HDTV broadcast system in which signals are transmitted in a compressed form is provided in W. Paik, "DigiCipher—All Digital, Channel Compatible, HDTV Broadcast System," *IEEE Transactions on Broadcasting*, Vol. 36, No. 4, December 1990, incorporated herein by reference.

Systems such as the HDTV broadcast system disclosed in the aforementioned Paik article transmit data in the form of variable length data packets. Since the data packets are of variable length, it is critical that the receiver have a means for distinguishing between adjacent packets. In other words, the receiver must keep track of when a current data packet ends and the next data packet starts. In the event that a transmission error occurs, which alters the expected length of a received data packet, or which causes an error in a packet length identifier transmitted with the data, synchronization at the receiver will be lost. It is important to provide a means for recovering from such transmission errors.

Often, error recovery is limited to the resynchronization of the receiver for each new video frame. By resynchronizing every frame, no more than one frame will be lost from the reconstructed video sequence. However, the reproduction of such an error in even one frame of a video image can result in a visible artifact that is unacceptable in a television picture. Concealment techniques, e.g., repeating a prior frame in lieu of a current frame in which the data has not been properly recovered, are known in the art. However, such concealment techniques will not always be effective in preventing noticeable degradations in a received video sequence.

It would be advantageous to provide a scheme for recovering from transmission errors more often than once per frame. Where data is transmitted in variable length packets, e.g., where successive blocks of quantized transform coefficients are transmitted, this would prevent an error in the length of one packet from propagating throughout the rest of the frame. It would be still further advantageous to provide a scheme wherein the periodic identification of correct data packet boundaries is provided within each frame, to enable prompt recovery in the event that an error in the length of one packet did propagate into succeeding packets.

The present invention provides an error recovery scheme that enjoys the aforementioned advantages, and specifically facilitates the recovery from transmission errors within a received video frame, without waiting until a succeeding frame in order to correct the error or reacquire the video signal.

SUMMARY OF THE INVENTION

In accordance with the present invention, a method is provided for storing data from a succession of received variable length packets to enable prompt recovery from errors affecting the identified length of a data packet. Data packets are provided with separate identifiers, each identifier designating a location in a header memory for storing a header associated with the data packet. A data packet start address is assigned to each data packet and stored along with the header in the header memory. Each data packet start address designates a location in a data memory for commencing the storage of data contained in a corresponding data packet.

In an illustrated embodiment, the variable length data packets are "macroblocks" that define video portions of a compressed television signal. The succession of macroblocks is received within portions of successive lines of a data multiplex frame, which contains video data for at least one television program. In the illustrated embodiment, each data multiplex frame comprises 525 lines of video, audio, and/or control data.

Information indicative of the length of a data packet currently being received is recovered from the header for that data packet. A next data packet position indicator is recovered from data contained in one or more lines of each data multiplex frame. A subsequent data packet position indicated by the next data packet position indicator is compared to a subsequent data packet position indicated by the current data packet length information to determine if a correspondence exists. If so, the current data packet length information is used to locate the subsequent data packet position. However, if the proper correspondence does not exist between the current data packet length information and the next data packet position indicator, the latter is relied on instead of the former to locate a subsequent data packet position. In a preferred embodiment, a plurality of next data packet position indicators are recovered during each data multiplex frame, to enable periodic verification of data packet boundaries. In this manner, a rapid recovery is provided should an error occur, since it can be assumed that the next data packet position indicators will properly point to a location in the incoming data stream at which a subsequent data packet will commence.

In order to recover the stored data for decoding, the data packet start address is read from the stored header of the data packet. The data portion of the data packet is then output from the memory for decoding, commencing at the data packet start address for the data packet.

Decoder apparatus in accordance with the present invention receives variable length data packets and stores encoded data from the packets to facilitate the recovery from transmission errors when outputting the data for decoding. Means are provided for labeling the data packets with separate identifiers. Each identifier designates a location in a header memory for storing a header associated with the data packet. Means responsive to the identifiers store the headers in designated locations of the header memory. A data packet start address is read from each stored header. Each data packet start address designates a location in a data memory for commencing the storage of data contained in a corresponding data packet. Means responsive to the data packet start addresses store data from the received data packets in designated locations in the data memory. Thus, the decoder apparatus is provided with a memory that is segregated into two sections. A first section contains header information for a plurality of received data packets. The second section contains the actual data from the data packets, organized such that the data for each packet commences at a location specified by a start address stored in the header for the data packet.

In an illustrated embodiment of the decoder apparatus, the variable length data packets are received within portions of successive lines of a data multiplex frame. Means are provided for recovering information, from the header for a data packet currently being received, indicative of the length of the data packet. At least one next data packet position indicator is received from data contained in one or more lines of the data multiplex frame. A subsequent data packet position indicated by the next data packet position indicator is compared to a subsequent data packet position indicated by current data packet length information to determine if a correspondence exists. If so, the current data packet length information is used as a pointer to the subsequent data packet. Otherwise, the next data packet position indicator is used as a pointer to the subsequent data packet. By providing a plurality of next data packet position indicators in each data multiplex frame, correct data packet boundaries can be periodically recovered independently of the data packet length information contained in the headers of the received data packets.

In an alternate embodiment, a plurality of next data packet position indicators are provided for each data multiplex frame. Each time a next data packet position indicator is recovered, it is used instead of the current data packet length information to locate the subsequent data packet in the received data stream. For data packets that occur before a next data packet position indicator is received, the current data packet length information recovered from the headers for the data packets is used to locate subsequent data packets.

In order to output information from the data memory of the decoder apparatus, means are provided for reading data packet start addresses from the stored headers for the data packets. The data combined in the data memory, commencing at the data packet start address for a data packet, is output. Decoder means are coupled to receive the data output from the data memory and decode the data packets represented thereby.

The data packet start addresses are generated locally at the decoder. Information is recovered from the header for a data packet currently being received, indicative of the length of the data packet. Means responsive to the recovered information generate the data packet start addresses, which are then inserted into the headers for storage in the header memory. In a preferred embodiment, the data memory comprises a plurality of rows for storing data, and the data packet start addresses provided by the generating means designate a new row in the data memory for commencing the storage of data from each new data packet. Thus, the portion of a row following the last bit of a data packet is not used; storage of the data from the next data packet will commence on the following row. This scheme, although somewhat wasteful of memory, simplifies the decoder by making it easier to address each new stored data packet.

Receiver apparatus is provided in accordance with the present invention for recovering variable length data packets from a received data stream. Means are provided for recovering information, from a header for a data packet currently being received, indicative of the length of the data packet. Means are also provided for periodically recovering next data packet position indicators from the received data stream. A subsequent data packet position indicated by a next packet position indicator is compared to a subsequent data packet position indicated by current data packet length information to determine if a correspondence exists. Means responsive to the current data packet length information locate a subsequent data packet in the received data stream in the event that the correspondence exists. Means responsive to the next data packet position indicator instead of the current data packet length information locate the subsequent data packet in the received data stream in the event that said correspondence does not exist. In this manner, the next data packet position indicators enable periodic verification of data packet boundaries during the receipt of the data stream and a rapid recovery should an error occur. In an alternate embodiment of the receiver apparatus, the current data packet length information is used to locate a subsequent data packet in the received data stream when a next data packet indicator is not recovered to override the current data packet length information. However, when a next data packet position indicator is recovered, it is used to locate the subsequent data packet in the received data stream.

BRIEF DESCRIPTION OF THE DRAWINGS

FIG. 2 is an illustration showing the organization of control, data, audio, video, and macroblock position information in the lines of a data multiplex frame;

FIG. 3 is an illustration showing the arrangement of successive macroblocks in a data stream;

FIG. 4 is an illustration of a macroblock, showing a header and video data portions thereof;

DETAILED DESCRIPTION OF THE INVENTION

The present invention provides improved error recovery in the communication of digital data. The invention has particular application to the communication of digital television signals, in which video information is transmitted as blocks of compressed data.

Figure 1:
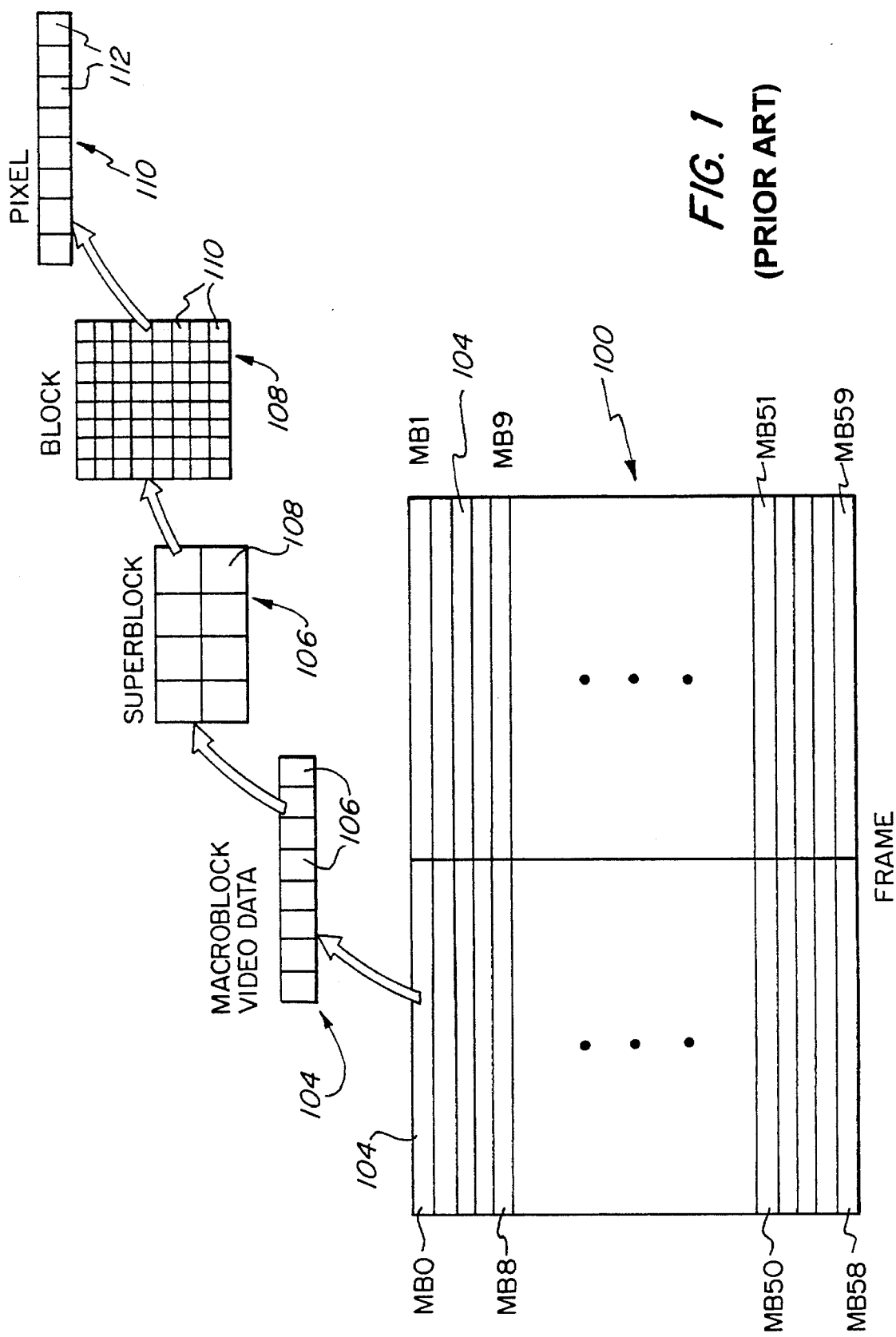
FIG. 1 is a diagrammatic illustration showing how pixels are arranged into blocks, blocks are arranged into superblocks, superblocks are arranged into macroblocks, and macroblocks are arranged to provide a frame of video data.

One format that can be used to transmit digital television information is to divide each video frame into a plurality of macroblocks. The macroblocks contain video pixel data, as illustrated in FIG. 1. A pixel 110 is an active video sample containing eight bits 112. The pixels are arranged into blocks 108, which are segments of video containing eight pixels horizontally by eight pixels vertically. A superblock 106 is a segment of video containing four blocks horizontally (32 pixels) and two blocks vertically (16 pixels). A macroblock 104 is a video segment comprising eight superblocks arranged horizontally. Finally, a frame 100 of video data contains 60 macroblocks, arranged as shown in FIG. 1 wherein a first macroblock (MB0) is located at the upper left-hand corner of the frame, the next macroblock (MB1) is located at the upper right-hand corner of the frame, and so forth such that the last macroblock (MB59) is arranged at the lower right corner of the frame 100. It should be appreciated that the arrangement illustrated in FIG. 1 represents a specific embodiment for use in connection with NTSC television signals. Many other arrangements can also be provided without departing from the spirit and scope of the present invention.

At an encoder, video is transformed into one luminance component (Y) and two chrominance components (CR, CB), as well known in the art, and sampled at a rate that produces 512 active video samples. All luminance samples are processed while chrominance is subsampled by a factor of four horizontally and two vertically. Thus, a superblock of video is transformed into eight luminance blocks and two chrominance blocks.

In the illustrated embodiment, a frame of video contains 480 active lines and each line contains 512 pixels. Superblock 106 illustrated in FIG. 1 also contains 512 pixels. Thus, sixteen superblocks or two macroblocks will cover sixteen complete video lines, providing the aforementioned frames of sixty macroblocks each.

Although a single channel of video information can be transmitted and received, it is more typical to provide a plurality of channels in a multiplexed data stream. The data for the plurality of channels is multiplexed together into macroblock segments. Due to their variable length encoding, the macroblock boundaries can occur anywhere within the data stream.

In a television embodiment according to the present invention, each macroblock contains compressed video data and header information for eight superblocks. The header information of all eight superblocks is grouped together and transmitted preceding the video data. This structure is illustrated in FIG. 4, in which macroblock 140 contains a header 136 followed by video data 128.

FIG. 2 illustrates a format that can be used to transmit video, audio, and control information in accordance with the present invention. Data stream 120 contains successive 525 line sets of data. Each 525 line set is referred to herein as a "data multiplex frame." Each line commences with a control channel (CC) 122 followed by a data channel (DC) 124. Control channel information is provided, for example, to enable access to particular television programs. This is accomplished by providing cryptographic keys to enable the receiver to decrypt authorized program data contained in the data stream. The data channel may contain one or more data streams that are carried along with the television information. Such data streams can be used, for example, to provide optional services to a user apart from the television services.

The control and data channel information on each line of the data multiplex frame is followed by audio information 126 pertaining to the television program. The audio data is followed by a macroblock 140 or a portion of a macroblock. Normally, a whole macroblock will not begin and end in a single line of the data multiplex frame. This is illustrated in FIG. 3, which depicts a portion of data stream 120 wherein a macroblock starts as indicated at 134 in a first line generally designated 135. Line 135 contains a portion of video data 128a from a previous macroblock, which is followed by a header 136 of a new macroblock and a portion of the video data 128b from the new macroblock. The rest of the video data for the new macroblock is contained in line 137. Video data from subsequent macroblocks (e.g., 128c) starts and ends in the same manner, with individual macroblocks typically spanning more than one line.

As indicated in FIG. 2, the first line of each data multiplex frame also contains system control data 130. The system control data is used by the decoder to identify various parameters, such as the type of data being received (e.g., NTSC data or non-NTSC data) and the number of video services provided in the data stream. The provision of system control information in a data stream is well known in the art, and does not form part of the present invention.

In accordance with the present invention, a next macroblock position (NMP) indicator 132 is periodically provided in the data stream. In the specific embodiment illustrated, the NMP is contained in every 15th line of the transmitted waveform. The NMP is used by the decoder for macroblock acquisition and tracking.

There are three conditions that affect how the NMP is computed. Most of the time, the NMP will designate the number of bits remaining from the occurrence of the NMP in the data stream until commencement of the next macroblock. In a specific implementation, the actual value of the NMP in this instance is one less than the number of bits remaining until the next macroblock, since it takes one bit time to actually load the NMP into a counter in the decoder. Therefore, by the time the NMP has been loaded, one bit time has already been used up, so that the value of the NMP must always be one less than the actual number of bits to the next macroblock. It is noted that the number of bits contained in the control channel, data channel, and audio channel are not included in the NMP calculation, as the number and position of these bits within each line of a data multiplex frame is fixed.

It is possible that the NMP will be directly followed by the commencement of the next macroblock. In this instance, since it takes one bit time to load the NMP, by the time the NMP is loaded, receipt of the next macroblock will already have commenced. Thus, the NMP cannot be used to designate the position of this new macroblock, and will be used to indicate the position of the next successive macroblock. Accordingly, the value of the NMP will be one less than the length of the macroblock that immediately follows the NMP in the data stream.

In the event that the NMP is determined to be greater than a predetermined number (e.g., 7FFFH in hexadecimal), then the NMP will be set equal to 7FFFH to indicate that it is invalid. Upon detecting this NMP value, the decoder will ignore the NMP since it is erroneous. It will be appreciated that if the NMP were greater than 7FFFH (15 bits, full scale) the NMP would be pointing to a position that is beyond the next NMP in a data multiplex frame that contains an NMP every 15 lines. The use of such an NMP would not make sense. It is also noted that in the illustrated embodiment, only the 14 least significant bits of the NMP are necessary for proper operation.

The provision of a plurality of NMPs within each data multiplex frame enables the decoder to recover from transmission errors that destroy information necessary to the decoder in order for the decoder to determine where each new macroblock starts. In the system of the present invention, such information includes a field in the header for each macroblock that indicates the length of the macroblock. In a preferred embodiment, the decoder will use the macroblock length information (designated MLEN) in the header for each macroblock to determine the location of the next macroblock, unless an NMP indicator occurs during the receipt of the current macroblock. In the event an NMP indicator is received, the subsequent macroblock position indicated by the NMP is compared to the subsequent macroblock position indicated by the current MLEN information to determine if a correspondence exists (i.e., whether the NMP and MLEN both point to the same position). If they do not point to the same position, the NMP is assumed to be correct, and is relied on to indicate the position of the next data packet. Thus, where an error occurs in the MLEN, or where the decoder loses synchronization with the received data stream for one reason or another, the occurrence of the NMP indicator will enable the decoder to recover promptly. Obviously, the more NMPs that are provided within a data multiplex frame, the quicker the decoder will be able to recover from such an error.

The provision of an MLEN field in the header of each macroblock, and a plurality of NMP indicators within each data multiplex frame, provides redundancy in the variable length macroblock processing. This redundancy allows each macroblock to stand alone in terms of its processing, rather than depend on specific fields transmitted only once per frame, or on data provided in nonselected channels, as is typical in the prior art. Most importantly, redundancy can localize the effects of errors in the all-important MLEN fields. Without such redundancy, a single error in an MLEN field would destroy all macroblock processing for the remainder of the data multiplex frame, and partly into the next frame. Without redundancy in the identification of each received macroblock, such a timing error could also force a restart procedure in the decoder, further exacerbating the effect of the errors.

Upon recovery of the macroblocks from the data stream, the decoder of the present invention stores the macroblocks in a unique manner that facilitates the proper retrieval of the macroblock data for further decoding. Specifically, the macroblock headers 136 are stored in a header memory and the macroblock data (video data 128) is stored in a separate data memory. In the illustrated embodiment, a conventional video random access memory (VRAM) is partitioned into a header section and a separate video data section to store the header and data information. The arrangement of the VRAM is illustrated in FIG. 5.

As indicated, VRAM 150 includes a header section 152 and a video data section 154. The illustrated embodiment is designed to store up to 120 macroblocks. It will be appreciated that the amount of macroblock data that can be stored is largely dependent upon the channel capacity of the channel carrying the data stream and the number of services being transmitted in the data stream. Under worst case conditions, the configuration illustrated in FIG. 5 can support approximately 1.9 frames of macroblock data in an NTSC mode, using a single 128K×8 VRAM. However, it is recommended that the encoder providing the data stream be designed to ensure that no more than three quarters of a frame shift occur in either direction as a result of the data encoding and compression. The normal operating range of VRAM 150 is between zero and ninety macroblocks (i.e., up to 1.5 frames).

Figures 5, 6:
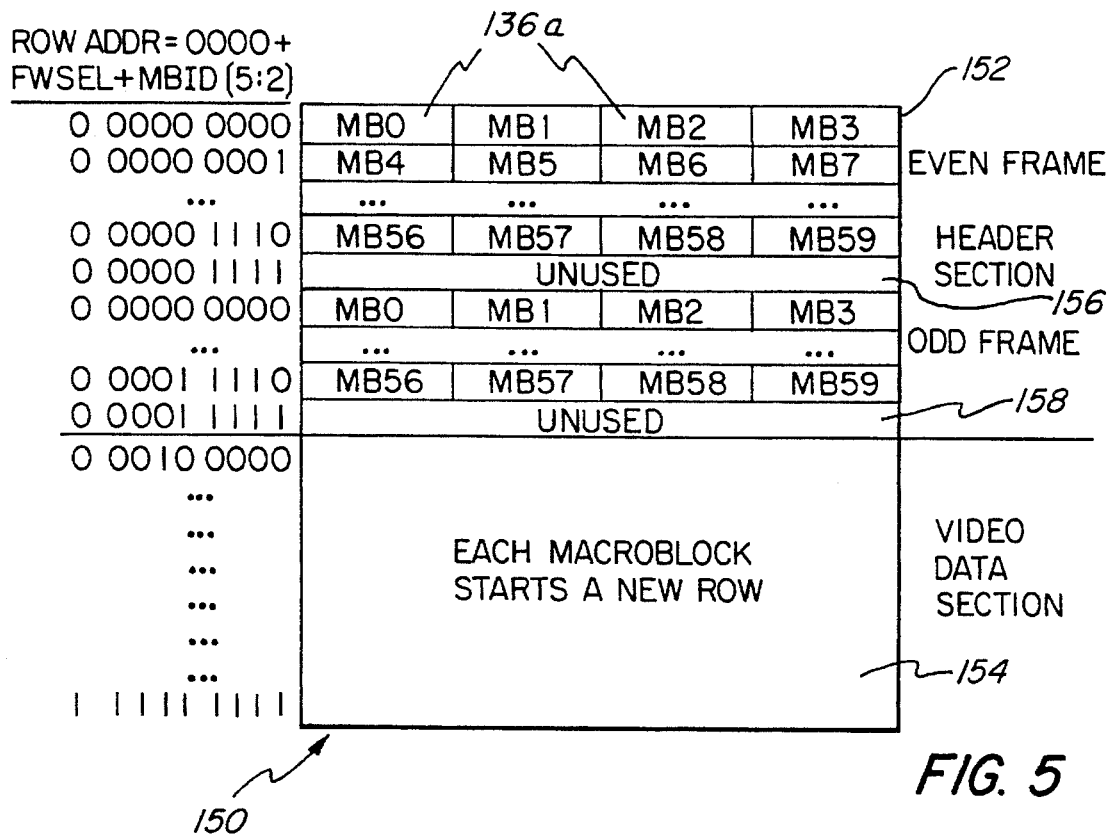
FIG. 5 is an illustration showing the arrangement of a header memory and data memory in accordance with the present invention.
FIG. 6 is an illustration showing the arrangement of information in a macroblock header stored in the header section in the memory of FIG. 5.

As illustrated in FIG. 5, header section 152 of VRAM 150 is large enough to accommodate two consecutive video frames. These are referred to herein as an "even" frame and an "odd" frame. In the illustrated embodiment, sixty macroblock headers (MB0–MB59) for the even frame are stored four across in the first fifteen rows of the header section. An unused row 156 separates the even frame headers from sixty odd frame headers (MB0–MB59) stored in the next fifteen rows of the header section. Another unused row 158 follows the fifteen rows of odd frame headers. The two unused rows 156, 158 may be written to as the result of an error in a macroblock identification field, and thus provide overflow space to protect the data in the following rows.

Addressing into the header portion of VRAM 150 is based on a macroblock identification field (MBID) and a frame write selection (FWSEL) which are included in each macroblock header retrieved from the incoming data stream. MBID and FWSEL are easily used to create a start address into the VRAM for storing the macroblock header data. In particular, the row address is formed by providing four leading zeros followed by the FWSEL field, which in turn is followed by the four most significant bits (bits 2–5) of the six bit MBID field. The six bit MBID field enables sixty macroblock headers to be addressed for each of the even and odd frames in the header section. The FWSEL field distinguishes between the even frame headers and the odd frame headers.

The video data section of VRAM 150 is composed of the remaining 480 rows of the 512 row memory. Each macroblock of video data is stored beginning at the start of a row to facilitate the recovery from errors that affect the actual or designated length of a macroblock recovered from the data stream.

An important aspect of the present invention is that after recovery of a macroblock from the incoming data stream, the decoder separates the macroblock header for storage in the header section of VRAM 150 and writes into the header a data start address that identifies the row on which the writing of the corresponding macroblock data commences in the data section of the memory. Since the location of the header for a particular macroblock within the header section of the memory is specifically defined by a unique macroblock identifier MBID, and the stored header contains a specific start address identifying where the data for that macroblock can be found in the data section of the memory, the recovery of data for each macroblock will stand on its own. Thus, an error in one stored macroblock will not affect any other macroblock. This scheme facilitates the prompt recovery from any macroblock error that does occur. An error in any one stored macroblock will not propagate through the memory causing severe picture degradation, which would require the memory to be reinitialized.

The start address for the storage of data for each macroblock is assigned at the decoder by a sync processor 210 described below in connection with FIG. 7. At initialization of the decoder, the sync processor will assign the first incoming macroblock to the first data location within the video data section 154 of the VRAM. Each subsequent macroblock will be assigned the next available data location commencing with a new row in video data section 154. After the last available row in the video data section has been used, the assignment of new data locations will cycle back to the beginning of the video data section.

The format of the macroblock headers stored in header section 152 of VRAM 150 is illustrated in FIG. 6. The header 136a is a somewhat revised version of the headers 136 received in the incoming data stream. In particular, a channel identification field (CHID) and the MLEN field that identifies the length of the received macroblock are not needed after acquisition of the macroblocks from the data stream. Thus, they are not contained in the headers 136a stored in VRAM 150. Since the MBID and FWSEL fields contained in the received headers are already embodied in the row addresses for the stored headers, these fields are also deleted from the headers 136a stored in the VRAM. Headers 136a are further modified by inserting the corresponding macroblock data start address 160 as described above.

The resultant header, illustrated in FIG. 6, is stored with the row address as described above and a column address formed from the two least significant bits aa of the MBID followed by the six bit patterns illustrated in the figure. Various portions in the header format have been reserved for future use, such as additional services that may be provided. These are designated by the term "reserved" or "X". Other header data is also provided to define specific macroblock processing parameters. As is clear from the column address scheme illustrated in FIG. 6, those fields that are specific to a particular superblock contain a superblock identification bbb in the column address for those fields.

The important point to focus on in connection with the present invention is that for each macroblock header 136a, a macroblock data start address is included at a specific row and column address of header section 152. The macroblock data start address points to the location in the video data section 154 where the corresponding macroblock data is located. And, since each macroblock data start address points to the beginning of a new row in video data section 154, the corruption of data in a previous macroblock will not affect the retrieval of data for a current macroblock.

Figure 7:
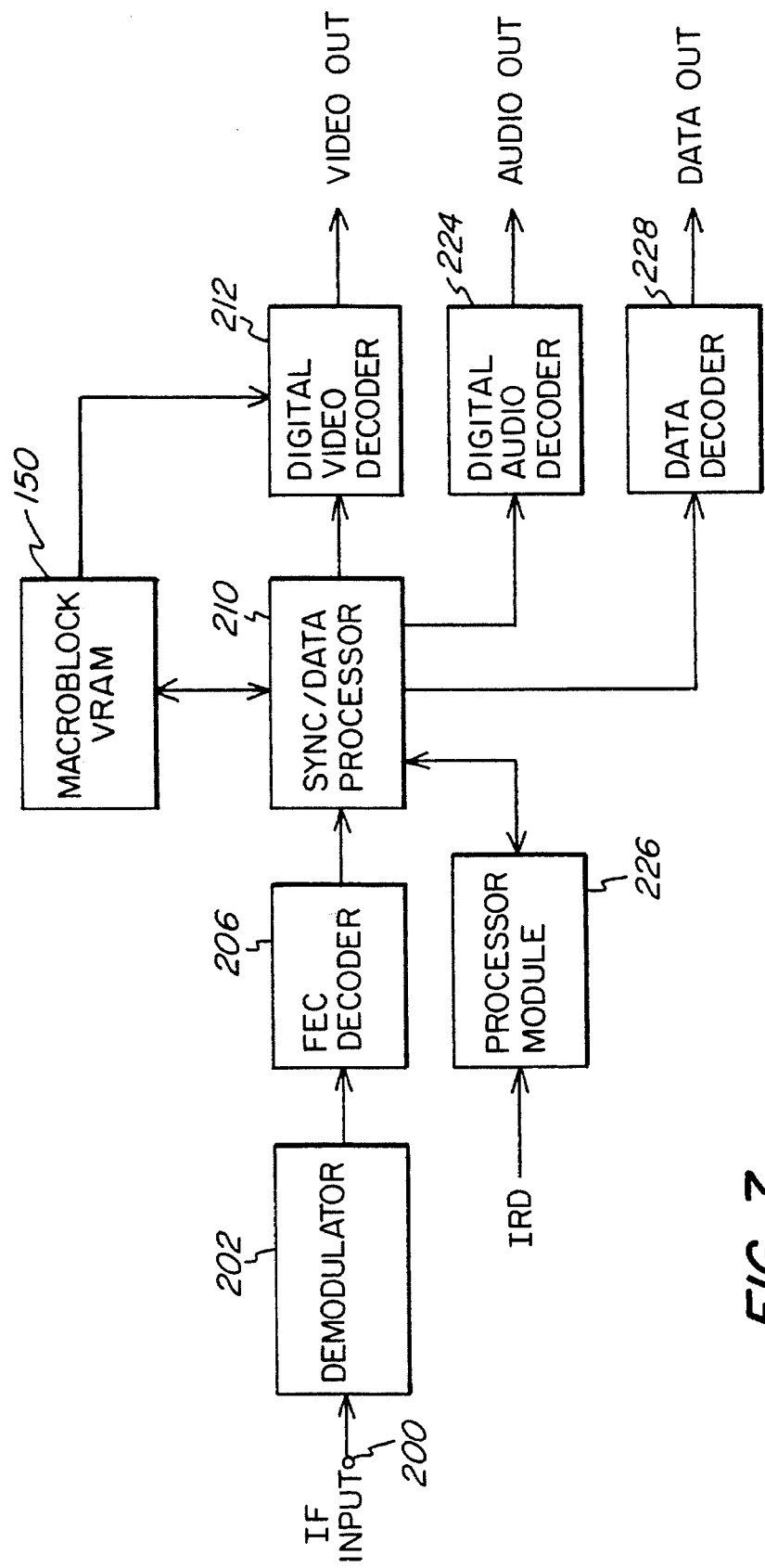
FIG. 7 is a block diagram of receiver apparatus in accordance with the present invention.

A receiver for recovering data in accordance with the present invention is illustrated in block diagram form in FIG. 7. The data stream, which was used to modulate a carrier for transmission, is received at an intermediate frequency by demodulator 202 via a terminal 200. The received carrier is demodulated and the demodulated data is input to a forward error correcting (FEC) decoder 206, which outputs the recovered data stream to a sync processor 210. The FEC decoder 206 comprises conventional components well known in the art.

Sync processor 210 detects a synchronization pattern in the received bit stream. During acquisition mode, an internal pattern detect signal synchronizes the line and sample counters to the input signal. Once aligned to frame timing, sync processor 210 is responsible for decrypting and demultiplexing the input bit stream from the FEC decoder into separate first-in first-out (FIFO) registers containing control channel, data channel, audio, video, and video overhead. A system control register latches the system control information once each frame, providing information about the current channel configuration. All of the data stored in sync processor 210 is forwarded as needed to other receiver modules. Sync processor 210 also assigns the macroblock data start address for each macroblock, and provides timing to the other modules in the receiver.

Macroblock VRAM 150 stores the macroblock headers and data as described in connection with FIG. 5. Macroblock VRAM 150 also serves as the data interface and rate buffer between the input and output data streams. The sync processor fills the macroblock VRAM as data is received, while a digital video decoder 212 empties the macroblock VRAM to obtain coded video data. The decoder 212 decodes the coded video data to recover the original video data, reading coded video data from the macroblock VRAM 150 at a rate sufficient to support the decoding process.

Control signals from the sync processor 210 initiate the required processes each line, in accordance with the various fields contained in the corresponding headers stored in macroblock VRAM 150. The video overhead information that is needed by the digital video decoder is communicated once per superblock via a serial interface from sync processor 210.

A digital audio decoder 224 comprises a digital signal processor (DSP) and is used to decompress audio data in a conventional manner. The DSP receives compressed audio from sync processor 210 and provides decompressed digital audio to an oversampled digital filter, which then feeds a dual 16-bit linear digital-to-analog converter.

A processor module 226 is provided to interface with an integrated receiver descrambler (IRD) operated by a television viewer to select a desired program. Such IRDs are well known in the art, and can be obtained, for example, from the VideoCipher Division of General Instrument Corporation, San Diego, Calif.

It should now be appreciated that the present invention provides a method and apparatus for storing data from a succession of received variable length data packets, to enable prompt recovery from errors affecting the actual or identified length of a data packet. Received data packets (e.g., macroblocks) are stored with a header portion thereof in a header memory and a data portion thereof in a data memory. A data start address provided in the stored header portion for each data packet points to the starting address for the corresponding data in the data memory. Each data packet start address points to the beginning of a new row in the data memory. The invention is particularly well suited to the communication of digital video data. In a preferred embodiment, a plurality of next data packet position indicators are provided for each data multiplex frame of a television signal data stream to enable periodic verification of data packet boundaries during the receipt of the data stream and a rapid recovery should an error occur.

What is claimed is:

1. A method for storing data from a succession of variable length data packets containing a header portion and a data portion and received within portions of successive lines of a data multiplex frame, to enable prompt recovery from errors affecting the identified length of a data packet, comprising the steps of:

assigning data packet start addresses to said data packets, each data packet start address designating a location in a data memory for commencing the storage of data contained in a corresponding data packet;

storing the data packet start addresses in designated locations of an address memory;

storing the data portions of the received data packets commencing in data memory locations designated by the corresponding data packet start addresses;

recovering information, from the header portions of data packets being received, indicative of the length of the respective data packet for use in establishing data packet boundaries; and recovering a plurality of next data packet position indicators from fixed positions in different lines of said data multiplex frame;

said next data packet position indicator reestablishing correct data packet boundaries during the receipt of said data multiplex frame should an error occur in said data packet length information.

2. A method in accordance with claim 1 wherein the correct data packet boundaries are reestablished by the steps of:

comparing a subsequent data packet position indicated by one of said next data packet position indicators to a subsequent data packet position indicated by the current data packet length information to determine if a correspondence exists; and relying on the next data packet position indicator instead of the current data packet length information to locate said subsequent data packet position in the event that said correspondence does not exist.

3. A method in accordance with claim 1 wherein:

said address memory is a header memory that stores each data packet start address together with data from the header portion of the data packet to which the data packet start address corresponds.

4. A method in accordance with claim 3 comprising the further step of recovering stored data from said data memory for decoding by:

reading the data packet start address from the stored header portion of a stored data packet; and outputting the data portion of said stored data packet from said data memory commencing at the data packet start address read from said stored header portion.

5. Decoder apparatus for receiving variable length data packets containing a header portion and a data portion from portions of successive lines of a data multiplex frame, and for storing encoded data from said data portions to enable prompt recovery from errors affecting the identified length of a data packet, comprising:

means for assigning data packet start addresses to said received data packets, each data packet start address designating a location in a data memory for commencing the storage of data contained in the corresponding data packet;

means for storing the data packet start addresses in designated locations of an address memory;

means responsive to said data packet start addresses for storing data from the received data packets in designated locations in said data memory;

means for recovering information, from the header portions of data packets being received, indicative of the length of the respective data packet for use in establishing data packet boundaries;

means for recovering a plurality of next data packet position indicators from fixed positions in different lines of said data multiplex frame; and means for using said next data packet position indicators to reestablish correct data packet boundaries during the receipt of said data multiplex frame should an error occur in said data packet length information.

6. Decoder apparatus in accordance with claim 5 wherein said means for reestablishing correct data packet boundaries comprise:

means for comparing a subsequent data packet position indicated by one of said next data packet position indicators to a subsequent data packet position indicated by current data packet length information to determine if a correspondence exists;

means responsive to the current data packet length information to locate a subsequent data packet in a received data stream in the event that said correspondence exists; and means responsive to said next data packet position indicator instead of the current data packet length information to locate said subsequent data packet in said received data stream in the event that said correspondence does not exist.

7. Decoder apparatus in accordance with claim 5 wherein said means for reestablishing correct data packet boundaries comprise:

means responsive to each recovered next data packet position indicator to locate a subsequent data packet in said received data stream; and means responsive to the current data packet length information to locate a subsequent data packet in said received data stream when a next data packet indicator is not recovered to override the current data packet length information.

8. Decoder apparatus in accordance with claim 5 further comprising:

means for reading the data packet start address for a stored data packet from said address memory;

means for outputting the data portion of said stored data packet from said data memory commencing at the data packet start address read from said address memory; and data decoder means coupled to said data memory for receiving and decoding said output data portion.

9. Decoder apparatus in accordance with claim 5 wherein said assigning means are responsive to said recovered data packet length information for generating the data packet start address for the data packet currently being received.

10. Decoder apparatus in accordance with claim 9 wherein:
said data memory comprises a plurality of rows for storing data; and
said assigning means provide a data packet start address pointing to a new row in said data memory for commencing the storage of data from each new data packet.

11. Decoder apparatus in accordance with claim 10 further comprising:
means for reading the data packet start address for a stored data packet from said address memory;
means for outputting the data portion of said stored data packet from said data memory commencing at the data packet start address read from said address memory; and
data decoder means coupled to said data memory for receiving and decoding said output data portion.

12. Decoder apparatus in accordance with claim 11 wherein said means for reestablishing correct data packet boundaries comprise:
means for comparing a subsequent data packet position indicated by one of said next data packet position indicators to a subsequent data packet position indicated by current data packet length information to determine if a correspondence exists;
means responsive to the current data packet length information to locate a subsequent data packet in a received data stream in the event that said correspondence exists; and
means responsive to said next data packet position indicator instead of the current data packet length information to locate said subsequent data packet in said received data stream in the event that said correspondence does not exist.

13. Decoder apparatus in accordance with claim 11 wherein said means for reestablishing correct data packet boundaries comprise:
means responsive to each recovered next data packet position indicator to locate a subsequent data packet in said received data stream; and
means responsive to the current data packet length information to locate a subsequent data packet in said received data stream when a next data packet indicator is not recovered to override the current data packet length information.

14. Decoder apparatus in accordance with claim 5 wherein:
said address memory is a header memory that stores each data packet start address together with data from the header portion of the data packet to which the data packet start address corresponds.

15. Receiver apparatus for recovering variable length data packets from a received data stream, said data packets defining a data multiplex frame, comprising:
means for recovering information, from a header for a data packet currently being received, indicative of the length of said data packet;
means for recovering a plurality of next data packet position indicators provided in said data multiplex frame;
means for comparing a subsequent data packet position indicated by a next data packet position indicator to a subsequent data packet position indicated by current data packet length information to determine if a correspondence exists;
means responsive to the current data packet length information to locate a subsequent data packet in the received data stream in the event that said correspondence exists; and
means responsive to said next data packet position indicator instead of the current data packet length information to locate said subsequent data packet in the received data stream in the event that said correspondence does not exist;
wherein said next data packet position indicators enable periodic verification of data packet boundaries within said data multiplex frame during the receipt of said data stream should an error occur.

16. Receiver apparatus for recovering variable length data packets from a received data stream, said data packets defining a data multiplex frame, comprising:
means for recovering information, from a header for a data packet currently being received, indicative of the length of said data packet;
means for recovering a plurality of next data packet position indicators provided in said data multiplex frame;
means responsive to a next data packet position indicator to locate a subsequent data packet in the received data stream upon the recovery of the next data packet position indicator; and
means responsive to the current data packet length information to locate a subsequent data packet in the received data stream when a next data packet indicator is not recovered to override the current data packet length information;
wherein said next data packet position indicators enable the periodic recovery of correct data packet boundaries within said data multiplex frame during the receipt of said data stream should an error occur.

* * * * *